Feb. 23, 1971 S. L. SEYMOUR 3,565,598
GLASS SHEET PRESS BENDING APPARATUS
Filed Oct. 3, 1968 4 Sheets-Sheet 1
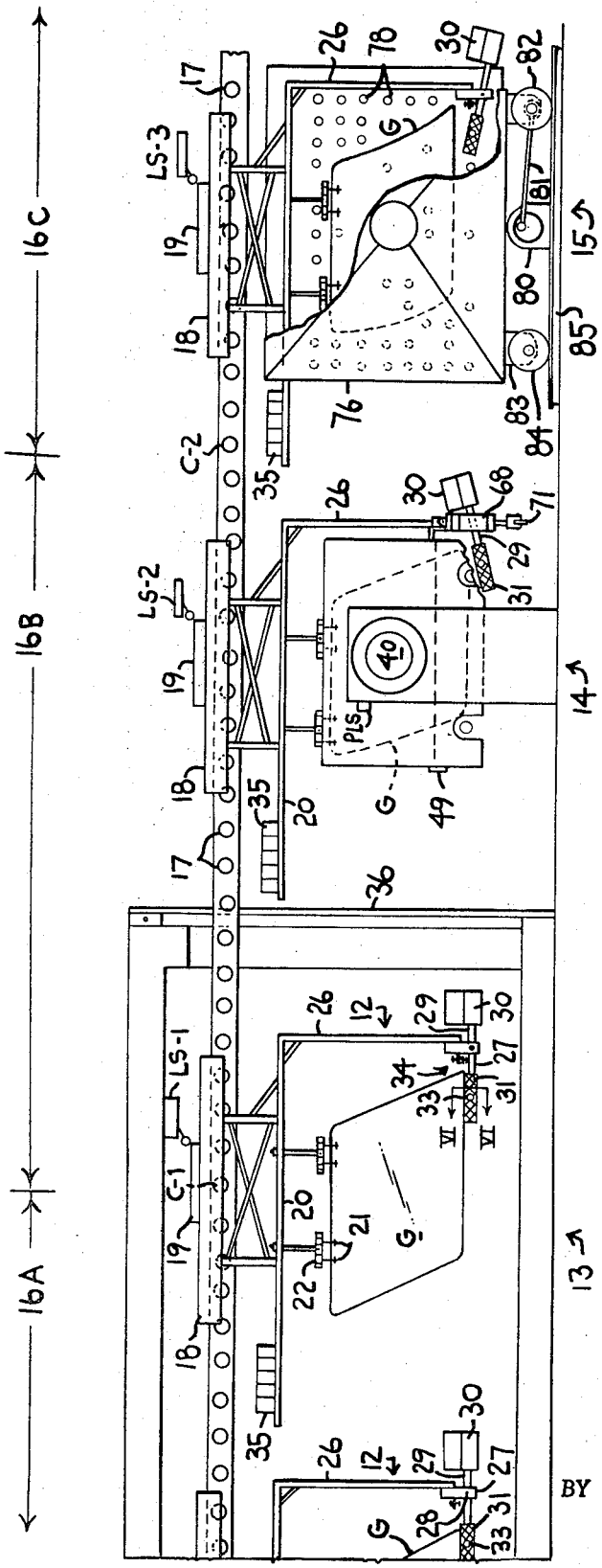
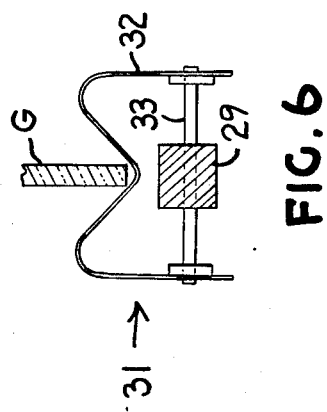
INVENTOR
SAMUEL L. SEYMOUR
BY Chisholm and Spencer
ATTORNEYS

INVENTOR
SAMUEL L. SEYMOUR
BY
ATTORNEYS

Feb. 23, 1971   S. L. SEYMOUR   3,565,598
GLASS SHEET PRESS BENDING APPARATUS
Filed Oct. 3, 1968   4 Sheets-Sheet 3

INVENTOR
SAMUEL L. SEYMOUR
BY
Chisholm and Spencer
ATTORNEYS 3,565,598
GLASS SHEET PRESS BENDING APPARATUS
Samuel L. Seymour, Oakmont, Pa., assignor to PPG Industries, Inc., Pittsburgh, Pa., a corporation of Pennsylvania
Filed Oct. 3, 1968, Ser. No. 764,821
Int. Cl. C03b 23/02
U.S. Cl. 65—273
4 Claims

ABSTRACT OF THE DISCLOSURE

Apparatus for contacting tong-suspended glass sheets during a selected portion of a heating, press bending, and tempering operation to help support to position the glass properly during certain critical portions of said operation.

This invention relates to treating glass sheets, and more specifically relates to the handling of glass sheets by tongs during certain heat-treatment operations, particularly those involved in fabricating bent and tempered glass sheets, particularly those used in automobiles. While the illustrative embodiment to be described will relate to the fabrication of a particular part of a non-rectangular shape for automobiles, it is understood that the principles of the present invention may be used to fabricate any glass article in which the glass is suspended from tongs while heated, shaped and/or tempered.

Glass sheets are presently bent and tempered in mass production by moving a series of glass sheets suspended from tongs through an elongated, tunnel-like furnace. The glass is heated to a temperature sufficient for it to deform readily upon engagement between a pair of glass-shaping members. When the leading glass sheet in the series reaches the desired temperature, it is removed from the furnace and shaped by pressing between a pair of shaping molds having surfaces that engage the opposite surfaces of the glass. The surfaces have complementary curvatures conforming to the shape desired for the bent glass sheet so as to impart the desired shape to the glass by pressurized engagement and are called "shaping surfaces" in the press bending art. Immediately after it is shaped, the glass sheet is moved into a rapid chilling area where the glass sheet is cooled suddenly to temper the sheet if tempering is desired.

The rapidity with which the glass is chilled determines its strength. When glass is tempered, it is provided with a skin stressed in compression that completely surrounds a core stressed in tension.

Tempered glass is stronger than untempered glass and resists fracture on impact to a much greater degree than untempered glass. Furthermore, tempered glass behaves differently from untempered glass when a sufficiently high load does succeed in fracturing the tempered glass. Upon fracture, tempered glass breaks up into relatively small, harmless fragments having relatively smooth surfaces. These small fragments are much less dangerous to people in the vicinity than the relatively large, jagged pieces characteristic of fractured, untempered glass.

In mass producing curved glass sheets for automobiles, two characteristics must be observed. First, the glass must be bent to the exact curvature desired, and secondly, if the glass is bent and tempered, it must be tempered to a sufficient extent so that the glass is stronger than untempered glass and has a satisfactory break pattern when broken. This latter characteristic requires the glass to fragment into said relatively small harmless particles having relatively smooth edges described above for tempered glass rather than the jagged fragments characteristic of untempered glass.

Most glass sheets produced on a mass production basis are suspended from tongs for passage through the tunnel-like furnace, into and out of a shaping station and for movement through a cooling area.

Since the glass sheets are freely suspended from tongs, they are subject to a considerable amount of swinging caused when the glass sheets are started and stopped and subjected to the various treatments described above. In addition, certain non-rectangular shapes cannot be supported in a satisfactory manner by tongs alone.

One of the purposes of the present invention is to provide means to help support the glass sheets during a critical portion of this cycle, such as the heating step, so that they arrive at the shaping station in proper position to be shaped. Unless the flat patterns of glass sheets arrive in proper orientation and alignment relative to the shaping members, if they are to be shaped to configurations involving non-uniform curvatures, any misalignment between the glass and the shaping members may cause to bend sharply in the wrong location and produce what is termed an "off bend" in the art. It is impossible to install a non-uniformly bent glass sheet properly within an automobile body when it has developed an "off bend" during its fabrication.

While the present invention is useful in properly positioning glass sheets to be bent to any curvature, this invention has particular benefit in the shaping of glass sheets by press bending to a non-uniform curvature having a main portion, an end portion and a sharply bent portion connecting the end portion to the main portion. In bending glass sheets to such a shape, it is customary to temper the sheets by sudden cooling immediately after they are press bent. When glass sheets are bent about a single axis of bending, it is preferred to transport the glass along a path that is parallel or substantially parallel to the axis of bending. In this manner, the flat glass is pressed between a pair of shaping members having complemental shaping surfaces to bend the glass into the desired shape and then transported between spaced nozzles arranged to form a space conforming substantially to the shape of the shaped glass. Air under pressure is supplied through the nozzles to chill the glass surfaces and temper the glass.

The glass is preferably bent about a horizontal axis of curvature so that the nozzles of the opposing sets can be arranged to terminate in curved configurations to form a curved space therebetween that conforms to the shape of the bent glass in vertical section as it occupies the cooling area. The nozzles are arranged to reciprocate linearly in paths substantially parallel to the path of movement and the axis of curvature for the glass.

The present invention comprises apparatus for supporting a glass sheet during heating, press bending and tempering comprising a carriage, tongs supported by said carriage for gripping a glass sheet near its upper edge, a glass engaging member pivoted to said carriage for movement into a glass engaging position at a location spaced from said tongs, means urging said glass engaging member into a glass engaging position, and means to limit the movement of said glass engaging member within a selected plane, preferably a vertical plane, so that the glass engaging member engages said glass sheet when the sheet has one configuration such as a flat configuration but not when the sheet has another configuration such as a curved configuration.

In order to understand the principles of the present invention, an illustrative embodiment will be described. In the drawings which form part of the description of said illustrative embodiment and wherein like reference numbers refer to like structural elements.

FIG. 1 is a longitudinal sectional assembly view showing a furnace, a shaping station and a cooling area in which an illustrative embodiment of the novel glass supporting apparatus of the present invention is employed;

FIG. 6 is an enlarged cross-sectional view of a glass engaging member; and

Figure 2:
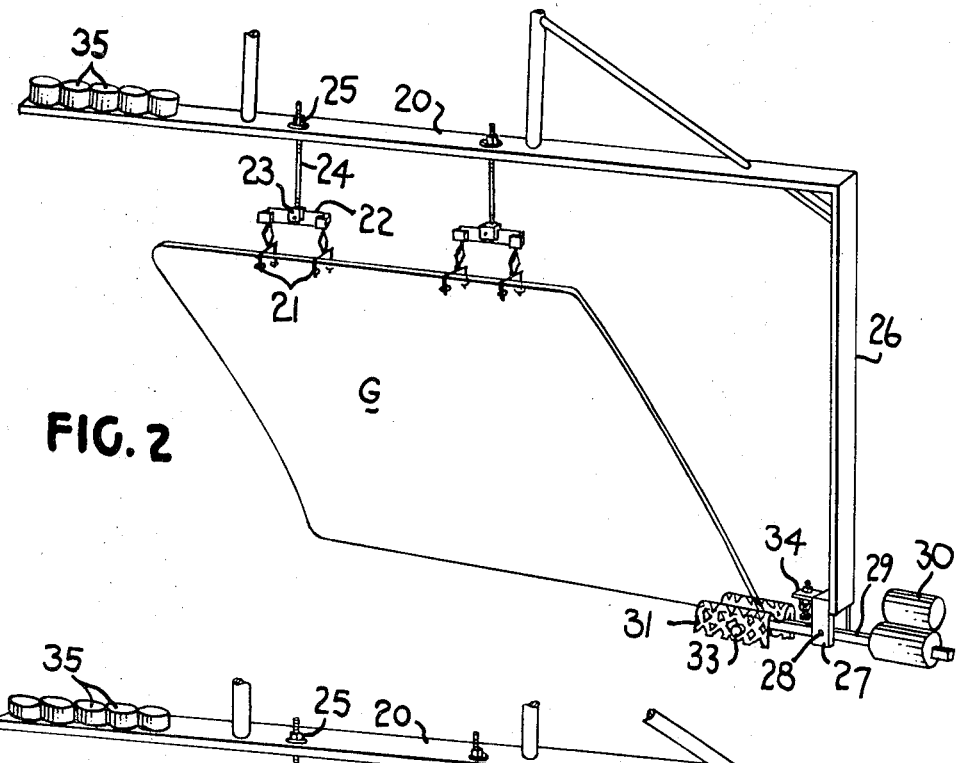
FIGS. 2, 3 and 4 are fragmentary perspective views of the illustrative embodiment of the glass supporting device showing the position occupied by the glass engaging member when the flat glass sheet is heated preparatory to bending, when the glass sheet undergoes bending, and when the bent glass sheet is cooled respectively.

Referring to the drawings, FIG. 1 shows a series of carriages 12 adapted for movement through a tunnel-like furnace 13, a glass shaping station 14 and a glass cooling area 15 to an unloading station (not shown).

A conveyor 16 includes a plurality of stub rolls 17 linearly spaced along the length of the furnace 13, the glass shaping station 14 and the cooling area 15 into the unloading station. Each carriage 12 is provided with a runner 18 that rests on the upper surface of a number of adjacent stub rolls 17 to permit the carriage to be propelled in a forward direction in response to rotation of the stub rolls 17.

The conveyor comprises a first conveyor section 16-A that extends from outside the furnace entrance (not shown) to near the other end of the furnace 13, a second conveyor section 16-B that extends from the end portion of the furnace 13 through the shaping station 14 and a third conveyor section 16-C extending through and beyond the cooling area 15 into an unloading station. A motor (not shown) operating at constant speed rotates the rolls 17 in the first conveyor section 16-A and is clutched in a manner well known in the art to the rolls in the other conveyor sections 16-B and 16-C by clutches C-1 and C-2, respectively. A separate high speed motor drives the rolls in the conveyor sections 16-B and 16-C intermittently. A cam 19 is disposed on the upper surface of each runner 18 of each of the carriages 12 to actuate high speed intermittent action of the second conveyor section 16-B in a well known manner.

The carriages also include a tong support bar 20 connected to the horizontal runner 18. Articulated, self-closing tongs 21 are suspended in pairs on pivoted arms 22 to grip the glass sheets adjacent the upper edges. The arms 22 are pivoted centrally to brackets 23 welded to the bottom of externally threaded rods 24. The latter are fixed in vertically adjustable position to the tong support bar 20 by lock nuts 25. Each carriage 12 also includes a vertically extending bar 26 extending downward from an end of the horizontal bar 20. A bracket 27 is fixed to the lower end of the vertical bar 26. A pivot pin 28 is supported in the lower portion of the bracket 27. A weighted arm 29, provided with weights 30 on its side beyond the vertical bar 26 and a glass engaging member 31 on its inner side, is pivoted to the pivot pin 28. The glass engaging member 31 is in the form of an inverted channel of expanded metal. The vertical walls 32 of the channel-shaped glass engaging member 31 are pivoted to a pivot pin 33 that is rigidly attached to lever arm 29 and extends laterally in both directions therefrom, as depicted in FIG. 6.

The arm 29 is arranged to have the weights 30 of sufficient mass to apply a rotational force about pivot pin 28 sufficient to raise the glass engaging member 31 into engagement with the bottom edge of a glass sheet G suspended from tongs 21. However, the weights are of insufficient mass to apply a net upward thrust equal to the gravitational forces acting on the glass sheet G through the glass engaging member 31 that contacts the glass sheet G along its lower edge.

The bracket 27 also supports a stop 34 for limiting upward rotation of the glass engaging member 31. The weighted arm 29 pivots in a vertical plane until it engages a portion of the bottom edge of a flat glass sheet G that extends beyond its upper edge when a flat sheet is suspended from tongs. The glass engaging member 31 of inverted channel shape is preferably of open mesh stainless steel about 6 inches long 1 inch wide and 1 inch high that is preferably made of expanded metal configuration $\frac{1}{16}$ inch thick and is pivotally attached to said pivot pin 33 in the central portion of its length. In FIG. 6, the web portion of the glass engaging member is crimped to insure proper positioning of the lower edge portion of the glass sheet.

The carriages 12 are each provided with weights 35 on the horizontal tong support bar 20 near the end opposite that attached to the vertical bar 26 to balance the load of the carriage. This balancing prevents the runners 18 from tending to tip and lose their balance on the stub rolls 17 during acceleration or deceleration of the carriage.

The furnace 13 is a conventional tunnel-like furnace extending from an entrance (not shown) to an exit which is intermittently closed by an exit door 36. The furnace contains refractory roof, floor and side walls which are supported by metal reinforcement in the manner well known in the art. The longitudinal side walls of the furnace support heating elements disposed in facing relation to the major surfaces of a series of glass sheets conveyed through the furnace to raise the temperature of the glass sheets G to a temperature sufficient for press bending and tempering. A limit switch LS-1 is positioned for engagement by cams 19 to actuate a timer T-1 as will be described later.

The shaping station 14 comprises a pair of shaping molds having complementary curvatures conforming to the shape desired for the press-bent glass. In the illustrative embodiment, the complementary shaping molds include a solid shaping mold 37 of convex configuration and a jointed shaping mold 38 of outwardly facing concave configuration. Each of the shaping molds is actuated for movement to and from a vertical plane occupied by a succession of glass sheets G traveling along the conveyor 16 in a manner well known in the art. For this purpose, piston rods 40 move in opposite directions to actuate the shaping molds 37 and 38.

The shaping surfaces of the shaping molds 37 and 38 are complementary to one another to provide a bend which, in this case, is sharply curved near the lower portion of the suspended glass sheets. A series of notches 41 is provided along the top of each of the shaping molds. The notches 41 are aligned in opposing relation to one another to provide spaces for clearance to receive the tongs 21 when the molds engage the glass sheet gripped by tongs during a glass sheet shaping operation.

A cover of knit fiber glass cloth is secured against the shaping face of each of the shaping molds to prevent direct contact between the hot glass and the shaping mold by covering the shaping face and securing the marginal portion by clamps to a structure behind the shaping face that forms part of the mold. The covers provide some thermal insulation between the hot glass and the molds and protects the hot glass from showing any imperfections that may be in the shaping faces of the molds. The covers and the clamps that secure the covers to the mold structure are omitted from the drawings to illustrate other features more pertinent to the present invention.

The solid shaping mold 37 comprises a relatively thin glass shaping plate 42 such as ¼ inch thick steel plate, having greater rigidity than the glass sheet to be bent and the requisite curvature on its glass facing surface and having notches 41 in the upper portions thereof as described previously. A relatively thick, rigid, steel plate 43 preferably ½ inch thick, is secured in spaced relation behind the shaping plate 42 by spaced connecting members 44 adjustable in length to correct the local curvature of the shaping plate 42 as disclosed in U.S. Pat. No. 3,367,764 to Samuel L. Seymour, assigned to PPG Industries, Inc. Such a mold also comprises a piston attachment plate 45 connected to plate 43 by additional spacing elements 46. The piston attachment plate 45 is attached to another piston rod 40 that is hidden behind the solid mold, but that is similar to the piston rod illustrated.

The jointed shaping mold 38 comprises a main mold member 47 having a shaping surface complementary to that of the upper portion of the solid shaping mold 37 and a lower shaping member 48 complementary in shape to that of the lower portion of the solid mold 37. Adjustable pivot means 49 pivotally attaches the upper end of the lower shaping member 48 in adjustably spaced relation to the lower end of the main mold member 47. A pair of small piston cylinders 50 is mounted in fixed relation to the main mold member 47 with movable piston rods 51 operatively connected to the rear of the lower shaping member 48 to actuate movement of the lower shaping member 48 about the adjustable pivot means 49 with respect to the main mold member 47 according to a timed sequence that will be described later.

The main mold member 47 of the jointed shaping mold 38 is constructed similarly to the solid shaping mold 37 except that its shaping plate 52 has a shape conforming to that of the opposite surface of the main portion of the glass sheet to be bent. As in the construction of U.S. Pat. No. 3,367,764, the shaping plate 52 of the main mold member 47 is attached through a series of lengthwise adjustable connecting members 53 (similar to the lengthwise adjustable connecting members 44 of the solid shaping mold member 38) to a relatively thick plate 54 (similar to plate 43). The latter in turn is secured to a piston attachment plate 55 through additional spacing members 56 similar to spacing members. The visible piston 40 is attached for movement to the piston attachment plate 55.

The lower end of the piston attachment plate 55 is apertured to receive each of the piston cylinders 50. The rods 51 extending from the piston cylinders 50 have free ends that are pivotally attached to the rear of a relatively thick rigid plate 57. The latter is secured by spaced, adjustable connecting members 58 (similar to connecting members 33 and 42) in spaced relation to the rear of a relatively thin shaping plate 59 whose surface facing the solid mold forms the shaping face of the lower shaping member 48 of the jointed shaping mold 38.

Each of the shaping members of the jointed shaping mold 38 is provided with a fiber glass cover secured in stretched relation over the entire shaping face of the shaping plate 52 of the main mold member 47 or shaping plate 59 of the lower shaping member 48 by clamping the cover margin to any available structure that moves with the shaping member such as the connecting members 53 and 58 and/or the marginal portion of the plates 54 and 57. The covers and their attachments are not shown to avoid disturbing the view of the structural elements that coact with the elements of the present invention, but any well known cover attachment may be used.

The adjustable pivot means 49 comprises a pair of pivots axially aligned with one another and extending laterally outward of the opposite ends of the jointed shaping mold 38. Each pivot 49 comprises a stub rod attached to a support bracket 60 fixed to the rigid plate 54 of the main shaping member 47 and an eye 62 at the upper end of an externally threaded rod rigidly attached by lock nuts in adjustable position to a slotted plate 64. The latter, in turn, is adjustably mounted on a rectangular pipe 65, which in turn is secured to the rigid plate 57 of the pivoted lower shaping member 48. Bracket 60 is secured to the under surface of an additional bracket 66 fixed directly to rigid plate 54. The additional bracket 66 has a T-member 67 attached thereto at its rear end.

A vertically extending piston cylinder 68 is mounted on the T-member 67. A vertical piston rod 69 extending downward from the piston cylinder 68 terminates in a bracket 70 pivotally attached to the inner end of angular lever arm 71. A pivot pin 72 about which the angular lever arm pivots extends from a downwardly extending bar 73 attached to rigid plate 54. The angular lever arm terminates in an upward extending finger 74 having a notched upper surface 75.

The notched upper surface 75 of the upwardly extending finger 74 of the angular lever arm 71 is adapted to make contact with the straight lever arm 29 outside of pivot pin 28 to counterbalance the force of the weights 30 and disengage the glass engaging member 31 from the bottom edge of the glass sheet G when the glass sheet bending operation at the shaping station 14 is in progress. The piston rod 69 is extended downward to cause the notched upper surface 75 to lift lever arm 29, thus lowering the glass engaging member 31 out of contact with the bottom edge of the glass sheet G when small piston cylinders 50 force their piston rods 51 toward the lower portion of the glass sheet G to help shape the latter. When shaping is complete, piston rod 69 is retracted and weights 30 urge the glass engaging member 31 upward. However, the bottom portion of the glass sheet has been bent away from the plane in which the glass engaging member 31 pivots and the stop 34 prevents the glass engaging member 31 from rotating upward to contact the bent glass above its bent lower edge.

A limit switch LS–2 is supported by the supporting structure for the conveyor 16 to initiate a timer mechanism T–2 which controls a program of operation described below.

The cooling area 15 is a conventional type of cooling apparatus employing a pair of plenum chambers 76 spaced from one another and having inward facing, apertured, vertical walls 77 provided with series of nozzles 78 that direct blasts of air or other cooling fluid against the opposite surfaces of the bent glass sheets that are conveyed out of the glass shaping station 14 for cooling. Since the illustrative embodiment shows glass bent about a horizontally extending axis of bending, the apertured walls 77 of the plenum chambers 76 that face one another are provided with series of nozzles of various lengths to form a curved passage between opposite nozzle sets that substantially conforms to the shape of the bent glass sheets passing therebetween.

A limit switch LS–3 is supported on the conveyor support structure to actuate a time T–3 which controls the operation of a clutch (not shown) that engages conveyor section 16–C to conveyor section 16–B.

A motor 80 drives the plenum chambers 76 in a horizontal reciprocating motion as air under pressure is introduced into the plenum chambers 76 from blowers (not shown) for exhaust through the nozzles 78 to impinge against the opposite glass sheet surfaces. To accomplish this end, the motor rotates a bell crank shaft 81 that is attached to one of a pair of cross shafts 82. Apertured ears 83 extending downward from each plenum chamber 76 are mounted on the cross shafts 82 which also support wheels 84 mounted on short tracks 85. All the driving mechanism is located below the path taken by the glass sheets G through the cooling area 15 to enable the sheets to pass between the opposite nozzle sets.

Figure 3:
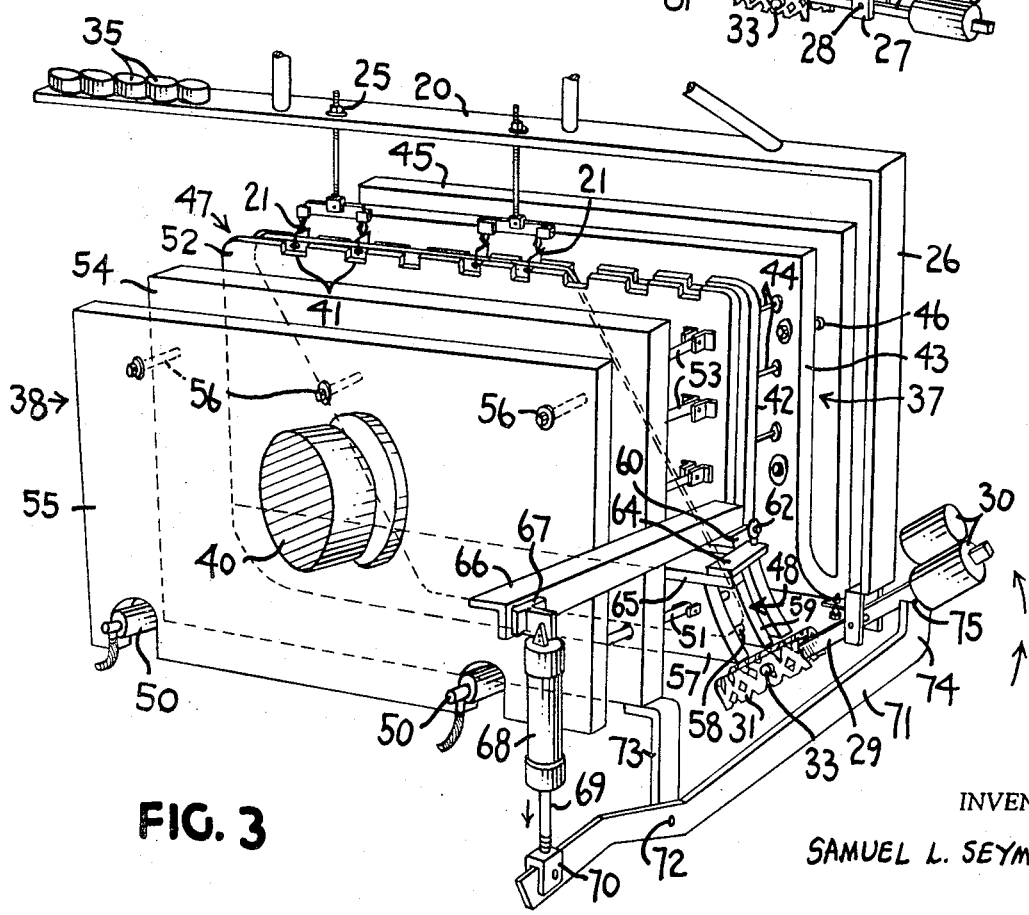
Figure 4:
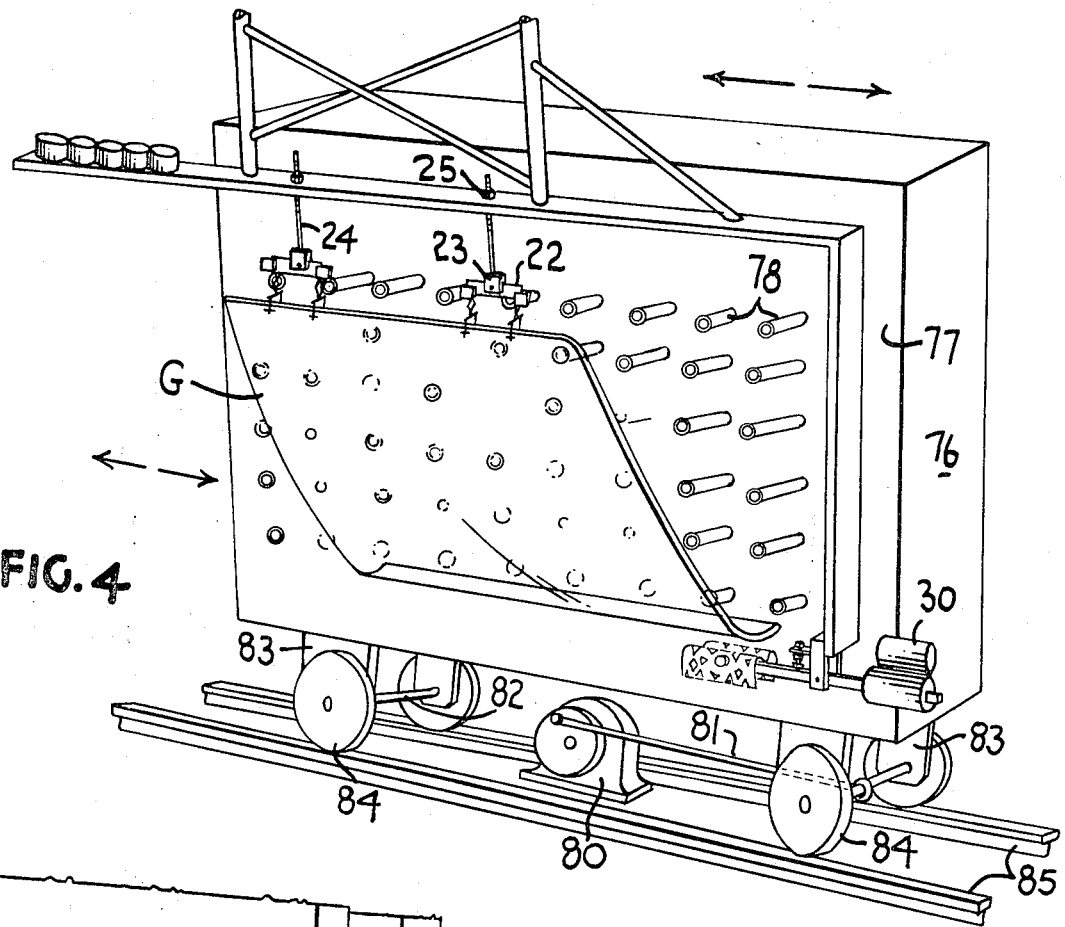

A study of FIGS. 2, 3 and 4 together with the chart of FIG. 6 will demonstrate how the present invention operates in a typical press bending and tempering operation. In FIG. 2, a glass sheet is shown suspended from a series of tongs as it passes through the furnace 13. In this region, the weighted lever arm 29 is shown pivoted into a position wherein the glass engaging member 31 engages a bottom edge portion of the flat glass sheet G and does not quite engage the stop member 34. This insures that the glass does not sway from side to side as its weight is freely suspended from the tongs 21 and also prevents the extended bottom edge portion of the glass sheet G from drooping during the heating step. The cam 19 on the carrier 12 engages limit switch LS-1 within the furnace 13 to actuate the timer T-1, which engages clutch C-1 to actuate the intermittent, high speed conveyor section 16-B, opens the furnace exit door 36 and closes the furnace door after sufficient time for the carriage to leave the furnace 13.

In FIG. 3, the glass sheet G is shown in the shaping station 14 with the tongs 21 aligned with notches 41 in the shaping plates of the respective mold members. The cam 19 has actuated limit switch LS-2, which has actuated timer T-2. The latter disengages clutch C-1 to stop the intermittent conveyor section 16-B when the glass sheet G opposes the shaping molds, then extends pistons 40 to move the shaping molds 37 and 38 toward the opposite surfaces of the glass sheet. When the upper portion of the sheet is contacted, the timer T-2 extends piston rod 69 of piston 68 downward to disengage the glass engaging member 31 and also extends the piston rods 51 of auxiliary pistons 50 in a forward direction to complete the shaping of the glass sheet G in its lower region by moving the lower shaping member 48 of the jointed shaping mold 38 against the lower portion of the glass sheet G to sandwich the latter against the lower portion of the solid convex shaping mold 37.

Figure 5:
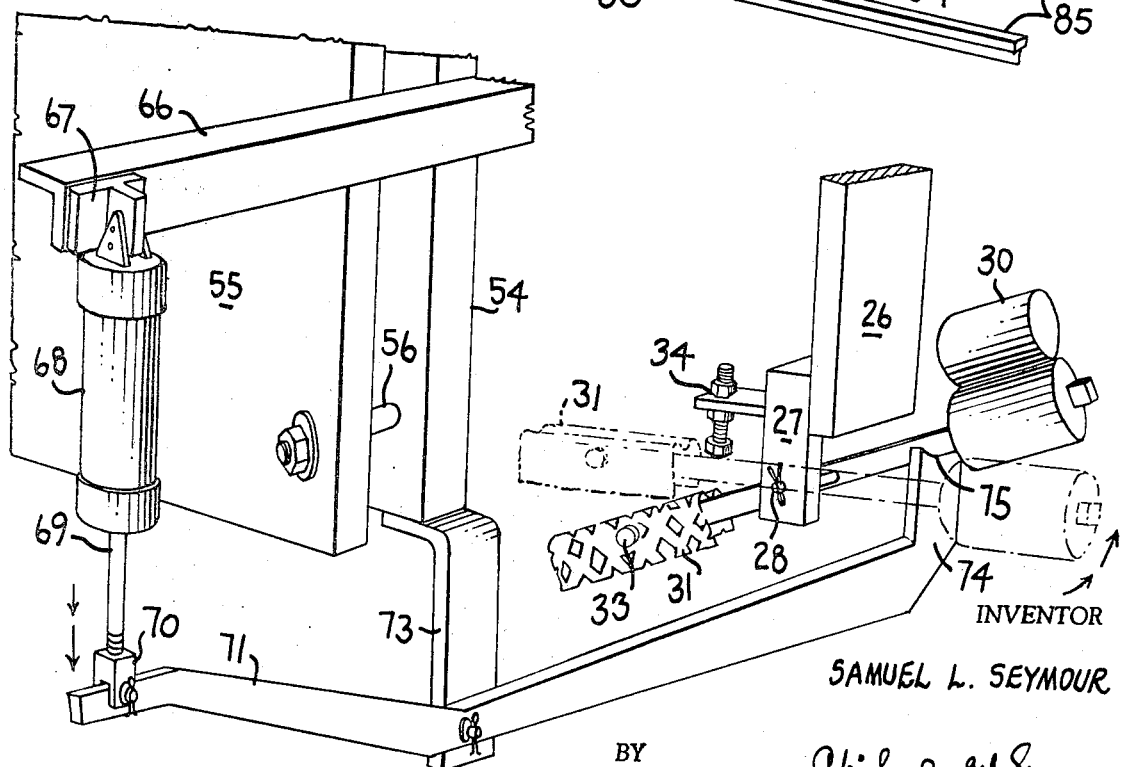
FIG. 5 is an enlarged, fragmentary view of an actuating element forming part of the present invention, showing how it actuates the removal of the glass engaging member from contact with a glass sheet during a glass shaping operation.
Figure 7:
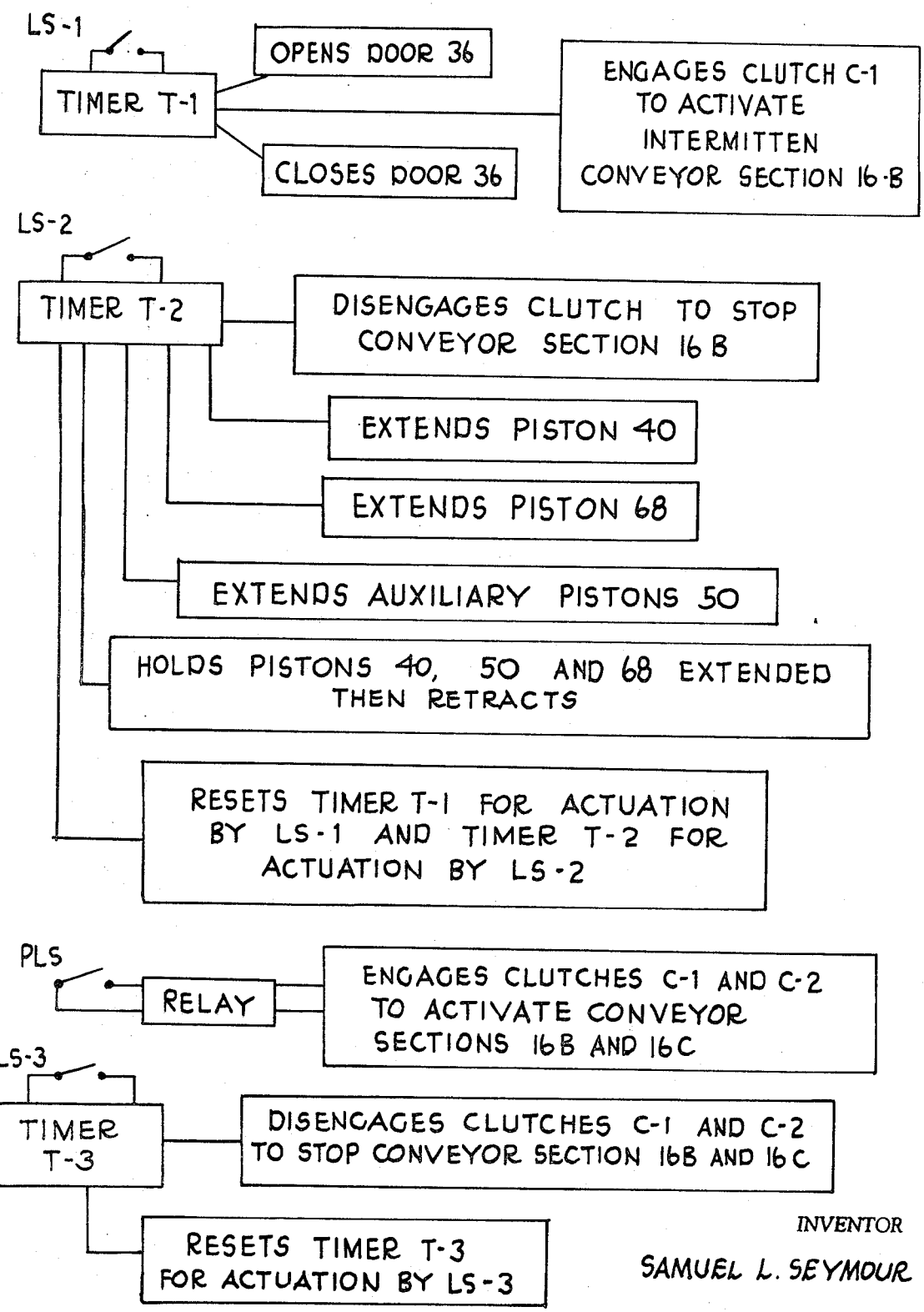
FIG. 7 is a chart showing the sequence of operations controlled by timer circuits actuated by limit switches engaged by a glass conveying carriage in an illustrative embodiment of the present invention.

FIGS. 3 and 5 show the situation existing when the air cylinder 68 has been actuated to extend the piston rod 69 thereby pivoting the crooked lever arm 71 that is forcing the finger 74 upward to have its notched upper portion 75 engage the straight lever arm 29 to pivot the glass engaging member 31 downward. This permits the shaping members 37 and 38 to impress their shape on the glass sheet without scraping the bottom edge of the glass sheet along the glass engaging member 31. Timer T-2 holds the piston rods of the pistons 40, 50 and 68 extended for a sufficient number of seconds to shape the glass properly. Then it retracts the pistons.

When piston 40 retracts, it engages a piston limit switch PLS at the glass shaping station. This latter limit switch actuates a relay that engages clutches C-1 and C-2, thus activating conveyor sections 16-B and 16-C. The intermittent conveyor sections 16-B and 16-C transfer the glass sheet G from the shaping station 14 to the cooling area 15. The reciprocating air blasts at the latter station impart a temper to the glass in a matter of 8 to 10 seconds. The carriage 12 is moved a sufficient distance to have its cam 19 actuate limit switch LS-3. The latter which actuates a timer T-3 disengages clutches C-1 and C-2 to stop the cariage 12 at the proper position of alignment between the sets of nozzles 78. This disengagement of clutch C-2 permits another carriage to move into the shaping station 14 on conveyor section 16-B while conveyor section 16-C is stopped.

The motor 80 and the blowers providing air under pressure to the plenum chambers are continuously operating. This continuous operation insures more uniform and more complete cooling of the glass sheet in the cooling area. However, if additional cooling is desired, an additional conveyor section (not shown) that operates continuously may be included beyond the clutch-operated conveyor section 16-C.

The glass sheets are separated a sufficient distance from one another in the furnace that timer T-2 times out and resets timers T-1 and T-2 for actuation by their respective limit switches LS-1 and LS-2 before the next carriage reaches a position where its cam 19 actuates limit switch LS-1 to start the next cycle of shaping and rapid cooling for the glass supported on the next carriage.

The counterweighted lever arm 29 pivots upward into contact with the stop member 34 after the shaping molds are retracted. However, since the bottom edge of the glass has been curved away from the vertical plane in which the flat glass is initially supported, and since the expanded metal glass engaging member 31 is of open mesh configuration, the glass surfaces are exposed to air blasted through the nozzles in the cooling area 15 and the glass is suitably tempered when it leaves the cooling area.

The illustrative embodiment of the present invention insures that the glass is in proper vertical plane, is aligned properly between the shaping molds and does not have any extending bottom portion excessively drooped when the heated glass sheet arrives at the shaping station 14. This insures that the glass sheet can be bent into an irregular shape within very close conformance to the exact tolerances needed to fit the bent glass into a curved frame of an automobile or other vehicle.

While the illustrative embodiment described above is particularly useful for engaging a tong-suspended glass sheet while flat, it is understood that only a slight modification is required to offset the glass engaging member from the vertical plane in which the flat glass is suspended to have it pivot in a vertical plane occupied by the bottom edge of the bent glass sheet after bending. The weighted lever is pivoted downward during shaping and released to allow the glass engaging member to pivot upward into position to engage the bottom edge of the bent glass after the molds are disengaged from the glass.

What is claimed is:

1. Apparatus for supporting a glass sheet during heating, press bending and tempering comprising a carriage, tongs supported by said carriage for gripping a glass sheet near its upper edge, a glass engaging member pivoted to said carriage for movement between a glass engaging position at a location spaced from said tongs and a disengaged position, means urging said glass engaging member to move between one of said positions to said other position, a glass shaping member movable into and out of glass engaging position, actuating means synchronized with movement of said glass shaping member to urge said glass engaging member from said other position to said one of said positions, and means to limit the movement of said glass engaging member within a selected plane, said glass shaping member having a shaping surface that changes the configuration of said glass sheet on engagement therewith to alter the position of a portion of said glass sheet engageable by said glass engaging member relative to said selected plane so that said glass engaging member engages said glass sheet when the sheet has one configuration but not when the sheet has another configuration.

2. Apparatus as in claim 1, wherein said glass engaging member is mounted for movement in a vertical plane in which said glass sheet is suspended before it is press bent.

3. Apparatus as in claim 1, wherein said glass engaging member is mounted for movement in a vertical plane laterally offset from the plane in which the flat glass is suspended, said laterally offset vertical plane intersecting a position occupied by the lower edge portion of the tong-suspended glass sheet after bending.

4. Apparatus as in claim 1, wherein said glass engaging member is mounted on the inner end of a lever arm, said lever arm is pivoted to said frame intermediate its ends about pivot means on said frame, and weight means attached to said lever arm outside said pivot means, said weight means urging said glass engaging member to pivot upward into a glass engaging position in the absence of an outside force, and said actuating means synchronized with movement of said glass shaping member to engage said lever arm and move said glass engaging member away from said glass sheet when said glass shaping member engages said glass sheet.

References Cited

UNITED STATES PATENTS 2,247,289   6/1941   Despret _____ 65—114

ARTHUR D. KELLOGG, Primary Examiner

U.S. Cl. X.R.

65—106, 275, 289